C. B. WOODWORTH.
PROTECTOR FOR PNEUMATIC TIRES.
APPLICATION FILED AUG. 24, 1911.
1,052,873.
Patented Feb. 11, 1913.
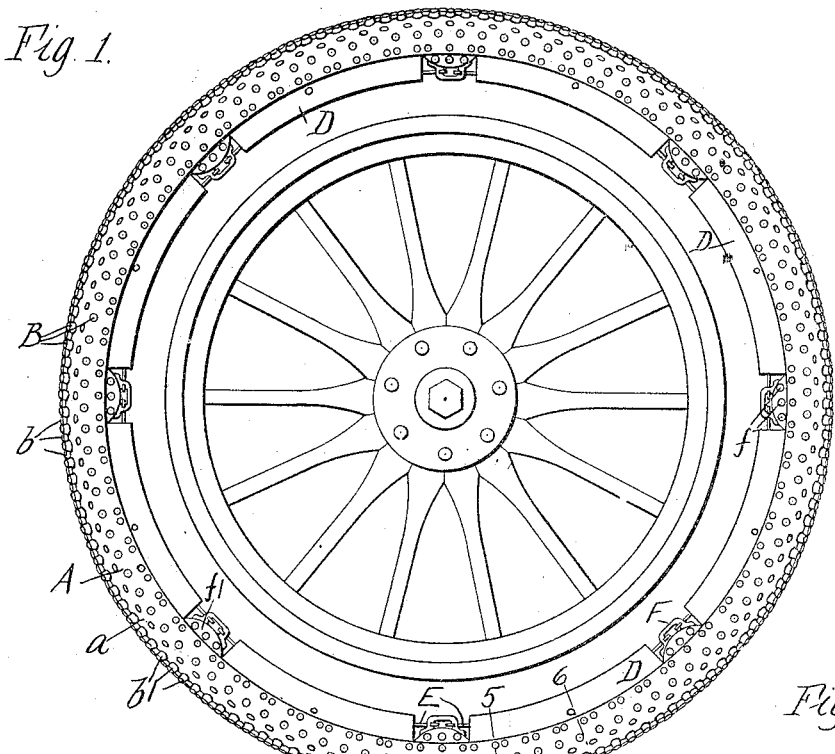
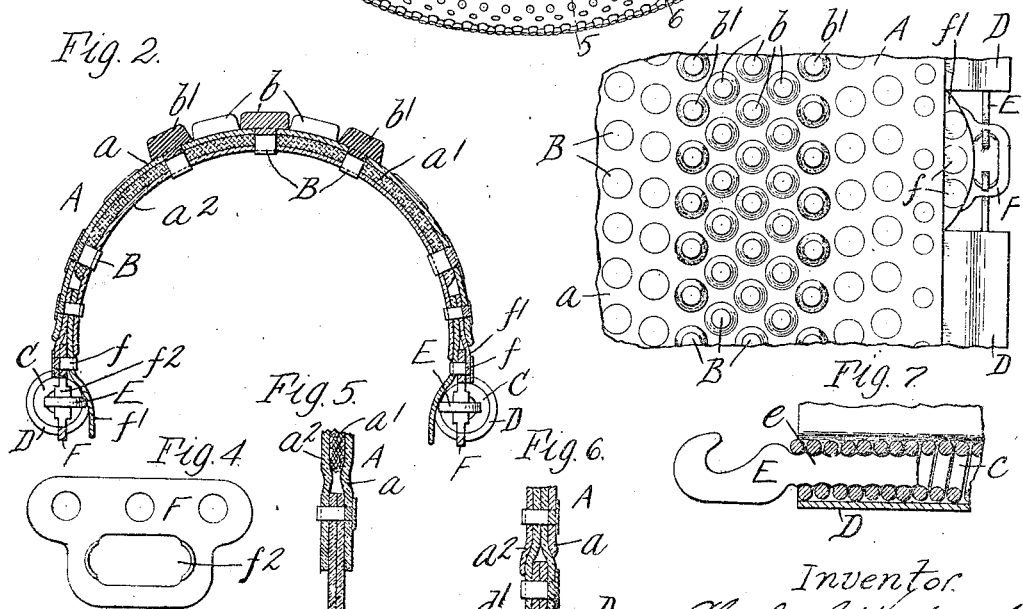

UNITED STATES PATENT OFFICE.

CHARLES B. WOODWORTH, OF NIAGARA FALLS, NEW YORK.

PROTECTOR FOR PNEUMATIC TIRES.

1,052,873.   Specification of Letters Patent.   Patented Feb. 11, 1913.

Application filed August 24, 1911. Serial No. 645,807.

*To all whom it may concern:*

Be it known that I, CHARLES B. WOODWORTH, a subject of the King of Great Britain, residing at Niagara Falls, in the county of Niagara and State of New York, have invented a new and useful Improvement in Protectors for Pneumatic Tires, of which the following is a specification.

This invention relates to improvements in protectors or treads for pneumatic tires of that type which are separate and detachable from the tire and are adapted to be secured on the tire after the latter is in place on the rim of the wheel.

The object of this invention is to construct a tread of this type which can be easily secured in position on the tire and adjusted so as to exert a proper tension and at all times retain its position thereon, and automatically accommodate itself to all the varying changes in the shape and contour of the tire.

A further object of the invention is to provide a protector which will protect the tire from wear, and from punctures, cuts and other injuries and which will materially increase the traction between the tire and the surface over which it travels and will tend to prevent the slipping or skidding of the tire.

In the accompanying drawings: Figure 1 is a side elevation of an automobile wheel having a tire provided with a protector embodying the invention. Fig. 2 is a cross section on an enlarged scale transversely of the protector. Fig. 3 is a fragmentary plan view of the face of the protector when detached. Fig. 4 is a plan view of one of the connecting plates on an enlarged scale. Fig. 5 is an enlarged fragmentary cross section of the protector in line 5—5, Fig. 1. Fig. 6 is a similar view in line 6—6, Fig. 1. Fig. 7 is a longitudinal sectional elevation on an enlarged scale of one of the connecting springs and its screw hook.

Like reference characters refer to like parts in the several figures.

The tire protector comprises an endless band or body portion A of flexible material which is adapted to extend continuously around the circumference or tread portion of the tire and is shaped so as to partially overlap the opposite side portions thereof. This body portion may be formed of any suitable flexible material which is sufficiently tough and durable to withstand the wear to which it is subjected. In the construction shown it is built up of an outer layer of leather $a$, intermediate layers of canvas or other fabric $a'$, and an inner layer of leather $a^2$. These layers or plies of material are firmly secured together by a plurality of metal rivets B which are preferably arranged in rows longitudinally of the protector.

The rows of rivets in the central portion of the protector which are opposite the tread portion of the tire and form the tread portion of the protector are made of very hard material and are provided with outwardly projecting heads or studs $b$ for engagement with the surface of the road. The rivets in the adjacent row at each side of the tread portion of the protector are of softer material and are provided with outwardly projecting heads or studs $b'$, similar in form to the heads $b$. The central rows of studs $b$ are adapted to engage the surface over which the tire travels and tend to prevent the tire from slipping thereon. Being formed of very hard material, they will stand a large amount of service before becoming worn down to the surface of the tread. The softer studs $b'$ at the opposite sides of the tread portion of the protector are adapted to engage the surface of the road, only when the tire starts to slip or skid sidewise. This side movement causes the tire to turn on the rim so as to bring the row of studs $b'$ on the side of the protector toward which the tire moves, into engagement with the road. These studs $b'$, being of softer and more abrasive material, will more firmly grip the surface than the harder studs $b$ and oppose any side or skidding movement of the tire. This is more especially the case when the tire is traveling over a very hard even surface, such as an asphalt pavement which the harder studs $b$ will not grip as effectually as the softer studs $b'$. The latter, being at the sides of the tread portion of the protector, are not subject to the constant wear which the central studs receive and will therefore wear as long and will not decrease the life or durability of the protector. While the studs $b$ and $b'$, described, constitute the heads of the rivets B, separate studs may be employed, if desired, which may be secured to the protector in any suitable manner. The remaining rivets along the opposite sides of the protector have thin flat faces which lie flush with the outer surface thereof.

To enable the protector to be fitted to and detached from the tire and to retain its position thereon and accommodate itself to the varying movements of the tire, the protector is provided along its opposite side edges with a plurality of longitudinally extending retaining springs C. These springs may be secured to the body portion of the protector in any suitable manner. In the construction shown, they are inclosed in leather loops D which are arranged at intervals along the opposite sides of the body portion A of the protector and have attaching portions which extend between the outer and inner layers $a$ and $a^2$ of the band A and are secured thereto by rivets $d$. Within these loops, centrally of the springs, are preferably arranged metal straps $d'$ which embrace the central portion of the springs and have their ends riveted to the loops. These straps serve to hold the springs in place in the loops and to stiffen the construction. The plurality of springs on each side of the protector are adapted to be detachably connected together at their ends and to be adjusted to a proper tension so that the protector will snugly and yieldably fit the tire. Any suitable connecting means may be employed for this purpose. In the construction shown, the opposite ends of each spring are provided with hooks E having shank portions $e$ which have screw threaded engagement with the spirals of the spring. These hooks may be made flat, as shown, and stamped from sheet metal. Their screw threaded engagement with the springs enables them to be adjusted relative to the springs to project a greater or less degree beyond the ends thereof.

Between the ends of adjacent springs at each side of the protector are arranged metal attaching lugs F which are firmly secured to the body portion of the protector by any suitable means, such as the rivets $f$ and the leather tongues $f'$ which are secured at their ends between the outer and inner layers $a$ and $a^2$ of the band A by rivets or other suitable means. These lugs are preferably formed by stamping them from sheet metal and are adapted to lie flat against the sides of the tire and project inwardly toward the center of the wheel, when the protector is in place thereon. Each lug is provided with a slot $f^2$ in which the hooks E of the opposite ends of adjacent springs are adapted to engage. The lugs thus serve to connect the hooks of adjacent springs and attach them to the protector and also prevent these hooks from turning under the action of the springs.

The protector can be readily placed on the tire by disconnecting all of the springs on one side and then sliding the protector sidewise over the tire. The springs can then be connected together and the protector thus secured in place. The adjustable connections between the ends of the springs enable the protector to be fitted snugly to the tire, so that it will exert sufficient tension thereon to retain its position, and the springs permit the protector to yield and move freely with the tire, so that it will not interfere with the resiliency of the tire.

By securing the attaching portions of the loops D and the lugs F to the band or body portion of the protector between the outer and inner layers of the material forming the protector, these attaching portions are protected by the outer layer of tough material of the protector from being caught and torn or shorn off by coming into contact with the sides of ruts, rocks, curb stones and the like, and the inner layer of the protector presents a smooth uninterrupted surface to the face of the tire which it engages.

I claim as my invention:

1. A protector for tires comprising a flexible band or cover which is adapted to inclose the outer portion of the tire and which is provided in its central tread portion with a plurality of outwardly projecting studs of hard metal and along the opposite sides of its tread portion with a plurality of outwardly projecting studs of softer metal, substantially as set forth.

2. A protector for tires comprising an endless flexible band which is adapted to be slid sidewise over the tire to inclose the outer portion thereof and has spaced attaching portions arranged along its opposite side edges and provided with slotted attaching lugs, coil springs arranged between adjacent attaching portions, and hooked connecting members which have screw-threaded engagement with the opposite ends of said springs and detachable engagement with said slotted lugs, substantially as set forth.

3. A protector for tires comprising an endless flexible band which is adapted to be slid sidewise over the tire to inclose the outer portion thereof and has spaced attaching portions arranged along its opposite side edges and provided with slotted attaching lugs, coil springs arranged between adjacent attaching portions, hooked connecting members which have screw-threaded engagement with the opposite ends of said springs and detachable engagement with said slotted lugs, and flexible connections between said band and said springs arranged on said band between said attaching portions and engaging said springs intermediate of their ends, substantially as set forth.

Witness my hand this 22nd day of August, 1911.

CHARLES B. WOODWORTH.

Witnesses:
  E. C. HURD,
  C. B. HORNBECK.